A. H. BRETT.
DEVICE FOR DIMMING THE HEADLIGHTS OF AUTOMOBILES.
APPLICATION FILED APR. 16, 1914.
1,132,554.
Patented Mar. 23, 1915.
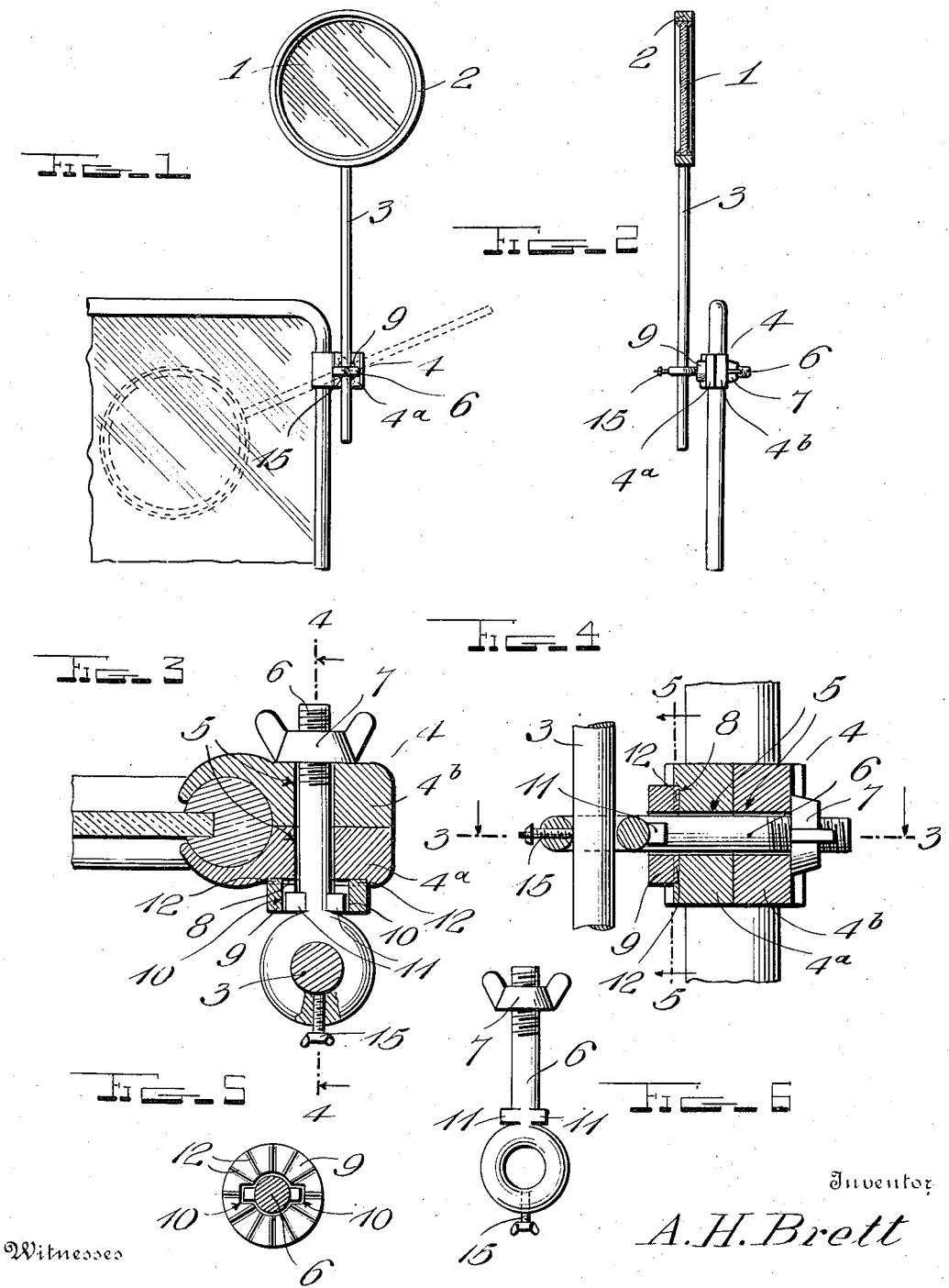
Witnesses
E. L. Haines.
Inventor
A. H. Brett
By H. B. Willson & Co.
Attorneys

UNITED STATES PATENT OFFICE.

ALBERT H. BRETT, OF MASON CITY, IOWA.

DEVICE FOR DIMMING THE HEADLIGHTS OF AUTOMOBILES.

1,132,554.     Specification of Letters Patent.     Patented Mar. 23, 1915.

Application filed April 16, 1914. Serial No. 832,282.

*To all whom it may concern:*

Be it known that I, ALBERT H. BRETT, a citizen of the United States, residing at Mason City, in the county of Cerro Gordo and State of Iowa, have invented certain new and useful Improvements in Devices for Dimming the Headlights of Automobiles; and I do declare the following to be a full, clear, and exact description of the invention, such as will enable others skilled in the art to which it appertains to make and use the same.

This invention relates to new and useful improvements in devices for dimming headlights of on-coming automobiles and the primary object of the invention is to provide a device applicable to any automobile now in use to prevent the rays of light projected from the headlights of on-coming automobiles from interfering with the view of the driver of the machine carrying this particular device.

Still another object of the invention resides in providing a device consisting of a colored glass adjustably mounted on a portion of the automobile and still another object of the invention resides in providing a device which is simple and durable in construction, inexpensive to manufacture and one which is very efficient and useful in operation.

With these and other objects in view, my invention consists in the novel features of construction, combination and arrangement of parts as will be hereinafter referred to and more particularly pointed out in the specification and claims.

In the accompanying drawing forming a part of the specification:—Figure 1 is an elevation of a device constructed in accordance with my invention and applied to use. Fig. 2 is a section therethrough with parts in elevation. Fig. 3 is an enlarged horizontal section as seen on line 3—3 of Fig. 4. Fig. 4 is an enlarged vertical section through the clamping member used in connection with this device. Fig. 5 is a section as seen on line 5—5 of Fig. 4, looking in the direction of the arrows, and Fig. 6 is an enlarged plan view of the eye bolt used in connection with the device.

In describing the invention I shall refer to the drawing in which similar reference characters designate corresponding parts throughout the several views and in which—

1 indicates a colored glass disk mounted in a metal frame 2 and secured to said frame in any desired manner is a tubular shank or stem 3. This glass disk 1 is preferably amber-colored to enable the eye to observe therethrough without being affected by strong rays of light and while this glass disk and the means for supporting the same, forms an essential feature of the invention another essential feature is the means for adjustably mounting the same on a particular portion of the automobile. I desire preferably to provide a means for securing this device to the wind shield of the machine and to this end I provide a clamp 4 which is formed of a pair of sections $4^a$ and $4^b$. The sections of this clamp are enlarged at the ends thereof and are provided with channels 5 which aline with one another when said sections of the clamp are brought together in proper relation to one another whereby to receive therethrough the shank of an eye bolt 6. A wing nut 7 is engaged with the threaded end of said eye bolt whereby it will be seen that the sections of clamp may be drawn together when desired and I have also provided a means for the retention of the eye of the bolt in a predetermined position with respect to the clamp.

In carrying out the idea of the retention of the bolt in a predetermined or adjusted position with respect to the clamping member the one face, the outer face of the section $4^a$, is provided with ratchet teeth 8 and a collar 9 is provided to be received on the shank of the bolt 6 between the eye thereof and the last mentioned face of the section $4^a$ of said clamp. The bore of the collar is enlarged at diametrically opposite points thereon or otherwise provided with notches indicated at 10 and projections are formed on said bolt, which projections are indicated as 11 and received in the notches or offsets 10 of said collar. It will thus be seen that with the rotation of the bolt with respect to the sections of the clamp 4, said collar will also be rotated therewith. The inner face of said collar 9 is provided with complementary ratchet teeth 12 for coöperation with the ratchet teeth 5 on the outer face of the section $4^a$. It will thus be seen that when the wing nut 7 is turned home to draw the bolt 6 to a position for securing the sections of the said clamp together, the teeth of the collar 9 will securely engage the teeth 8 on the section 4ª, thus securing said bolt in any position to which it may be adjusted. The adjustment of this bolt is really for the purpose of adjusting the eye portion thereof with respect to the clamp 4, inasmuch as said eye portion receives the shank or stem 3 which is carried on the frame supporting the glass disk. It will thus be seen that after this clamp 4 has been properly applied to the portion of the wind shield convenient therefor, this glass disk may be adjusted to the desired position with respect to said clamp by merely adjusting the eye of the bolt 6 with respect to said clamp. I have also provided a means for the adjustment of the stem or shank 3 with respect to said eye of the bolt. To this end a set screw 15 is provided in connection with said eye and through this medium said shank 3 may be secured in any adjusted position. In view of this particular construction it will be seen that this device is capable of application to any wind shield or any other portion of the machine convenient therefor and it is also capable of adjustment to suit the convenience of the driver of the automobile so that said driver may look through this glass disk at times when the rays of light projected from headlights of on-coming automobiles would ordinarily interfere with driving.

From the foregoing description of the construction of my improved device the manner of applying the same to use and the operation thereof will be readily understood and it will be seen that I have provided an improved headlight dimmer which is simple and durable in construction, inexpensive to manufacture and one which will be very efficient and useful in operation.

While I have particularly described the elements best adapted to perform the functions set forth it is obvious that various changes in form, proportion and in the minor details of construction may be resorted to, within the scope of the appended claims, without departing from the spirit or sacrificing any of the principles of the invention.

Having thus described my invention, what I claim is:

1. In a device of the class described, a clamping member formed in sections, an eye bolt passing therethrough, means engaged with said bolt to secure the sections of said clamping member together, one face of said clamping member being provided with ratchet teeth, and means carried on said eye bolt for engagement with the teeth on the one section of the clamping member, whereby to retain the eye of said eye bolt in various adjusted positions with respect to the clamping member.

2. In a device of the class described, a clamping member formed in sections, an eye bolt passing therethrough, means engaged with said bolt to secure said sections together, one face of one of the sections of said clamping member being provided with ratchet teeth, a collar carried on the eye bolt adjacent the eye thereon said collar being also provided with ratchet teeth for engagement with the ratchet teeth on the one section of the clamping member, whereby to secure the eye of said eye bolt in various adjusted positions with respect to said clamping member.

3. In a device of the class described, a clamping member formed in sections, an eye bolt passing therethrough, means engaged with said bolt and a portion of said clamping member to secure the sections of the latter together, one face of one section of the clamping member being provided with ratchet teeth, a collar loosely applied to said eye bolt between the last mentioned face of the clamping member and the eye of said bolt, one face of said collar being also provided with ratchet teeth for engagement with the teeth on the clamping member, and additional means in connection with the eye bolt and said collar for retaining the eye on said bolt in various adjusted positions with respect to the clamping member.

4. In a device of the class described, a clamping member formed in sections, an eye bolt passing through portions thereof, means engaged with said bolt and a portion of said clamping member to secure the sections of the latter together, one face of the one section of the clamping member being provided with ratchet teeth, a collar loosely applied to said eye bolt between the last mentioned face of said clamping member and the eye of said bolt, the inner periphery of said collar being provided with offsets at diametrically opposite points thereon, lugs carried on said eye bolt received in the offsets of said collar to secure the latter on the bolt, the one face of said collar being also provided with ratchet teeth for engagement with the ratchet teeth of the clamping member whereby to retain the eye of said bolt in various adjusted positions with respect to said clamping member.

In testimony whereof I have hereunto set my hand in presence of two subscribing witnesses.

ALBERT H. BRETT.

Witnesses:
J. M. FINLEY,
HENRY HEIMSRUSS.